US012602364B2

(12) United States Patent　　　　(10) Patent No.:　US 12,602,364 B2
Chen et al.　　　　　　　　　　　　　(45) Date of Patent:　　Apr. 14, 2026

(54) SCALABLE OBJECT STORAGE

(71) Applicant: Red Hat, Inc., Raleigh, NC (US)

(72) Inventors: Huamin Chen, Westford, MA (US);
Kefu Chai, Raleigh, NC (US)

(73) Assignee: Red Hat, LLC, Raleigh, NC (US)

( * ) Notice: Subject to any disclaimer, the term of this
patent is extended or adjusted under 35
U.S.C. 154(b) by 471 days.

(21) Appl. No.: 16/824,105

(22) Filed: Mar. 19, 2020

(65) Prior Publication Data

US 2021/0294783 A1　　Sep. 23, 2021

(51) Int. Cl.
G06F 16/22　　　　(2019.01)
G06F 9/455　　　　(2018.01)

(52) U.S. Cl.
CPC ...... G06F 16/2255 (2019.01); G06F 9/45558
(2013.01); G06F 16/2219 (2019.01); *G06F*
*2009/45583* (2013.01)

(58) Field of Classification Search
CPC .............. G06F 16/2255; G06F 9/4558; G06F
16/2219; G06F 2009/45583
See application file for complete search history.

(56) References Cited

U.S. PATENT DOCUMENTS

| | | | |
|---|---|---|---|
| 10,394,634 B2 | 8/2019 | Anjaneya et al. | |
| 10,437,627 B2 | 10/2019 | Hu et al. | |
| 11,895,126 B1 * | 2/2024 | Satish ................. | H04L 63/1425 |
| 2012/0209943 A1 * | 8/2012 | Jung .................... | G06F 15/161 |
| | | | 709/213 |

| | | | |
|---|---|---|---|
| 2013/0339643 A1 * | 12/2013 | Tekade .................. | G06F 16/215 |
| | | | 711/162 |
| 2014/0025770 A1 * | 1/2014 | Warfield .............. | G06F 16/256 |
| | | | 709/213 |
| 2014/0075222 A1 * | 3/2014 | Jackson ................. | G06F 1/329 |
| | | | 713/320 |
| 2017/0206218 A1 * | 7/2017 | Jai ........................ | G06F 16/2365 |
| 2018/0060107 A1 * | 3/2018 | Hu ....................... | G06F 9/45558 |
| 2019/0004888 A1 * | 1/2019 | Chagam Reddy .... | G06F 11/106 |
| 2019/0037014 A1 * | 1/2019 | Iland ................... | H04L 67/1021 |

(Continued)

FOREIGN PATENT DOCUMENTS

| | | | | |
|---|---|---|---|---|
| CN | 110321331 A | * 10/2019 | ......... | G06F 12/0864 |
| JP | 2014130489 A | * 7/2014 | ......... | G06F 16/2255 |

(Continued)

OTHER PUBLICATIONS

Weil, Sage A., et al., "RADOS: A Scalable, Reliable Storage Service
for Petabyte-scale Storage Clusters", University of California, Santa
Cruz, 2016, 10 pages, https://ceph.com/wo-content/uploads/2016/
08/weil-rados-pdsw07.pdf.

(Continued)

*Primary Examiner* — Aleksandr Kerzhner
*Assistant Examiner* — Loan T Nguyen
(74) *Attorney, Agent, or Firm* — Dority & Manning, P.A.

(57)　　　　ABSTRACT

According to one example, a method includes receiving
from a client device, a data object for storage within an
object storage system, performing a plurality of hashes on
the data object tenant profile data associated with the data
object to determine one of a plurality of object storage
devices to which to store the data object, and autoscaling the
object storage device based on active compute jobs associ-
ated with data objects stored on the object storage device.

18 Claims, 5 Drawing Sheets

(56)           References Cited

U.S. PATENT DOCUMENTS

| | | | |
|---|---|---|---|
| 2019/0236149 A1* | 8/2019 | Kuruvada | G06F 16/14 |
| 2019/0334770 A1 | 10/2019 | Xiang et al. | |
| 2019/0370049 A1 | 12/2019 | Gopalan | |
| 2020/0192899 A1* | 6/2020 | Joshi | G06F 16/24552 |
| 2020/0387490 A1* | 12/2020 | Schulze | G06F 16/2228 |
| 2021/0240369 A1* | 8/2021 | Cain | G06F 3/0679 |

FOREIGN PATENT DOCUMENTS

| | | | | |
|---|---|---|---|---|
| JP | 6028567 B2 * | 11/2016 | | G06F 16/2255 |
| WO | WO2018034971 | 2/2018 | | |

OTHER PUBLICATIONS

"SUSE Enterprise Storage", 2020, https://www.suse.com/products/
suse-enterprise-storage/.

* cited by examiner

400

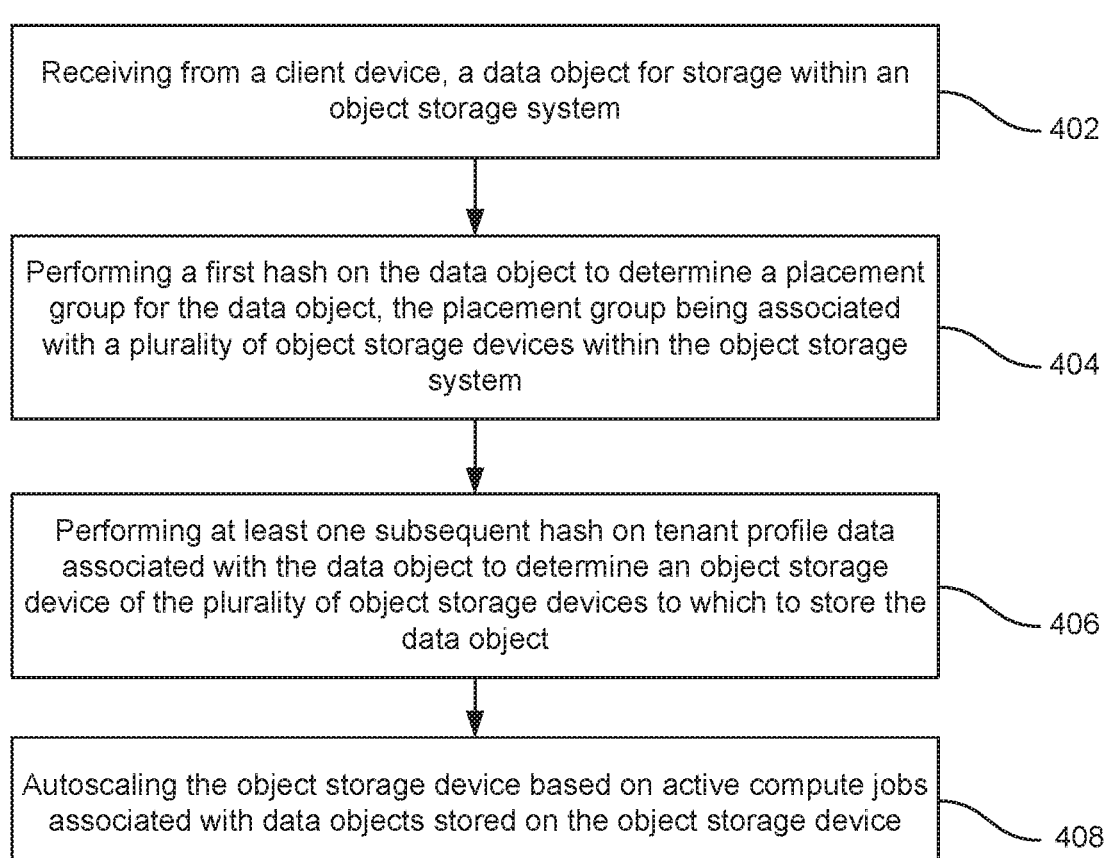

| Receiving from a client device, a data object for storage within an object storage system | 402 |

| Performing a first hash on the data object to determine a placement group for the data object, the placement group being associated with a plurality of object storage devices within the object storage system | 404 |

| Performing at least one subsequent hash on tenant profile data associated with the data object to determine an object storage device of the plurality of object storage devices to which to store the data object | 406 |

| Autoscaling the object storage device based on active compute jobs associated with data objects stored on the object storage device | 408 |

Network
Interface
514

User Interface
512

Memory
504

Software
506

Data
Store
508

Processor
510

SCALABLE OBJECT STORAGE

BACKGROUND

The present disclosure relates generally to object storage, and more particularly, systems and methods for object storage that allows for better scalability.

Cloud computing infrastructures typically include compute nodes and storage nodes. Compute nodes, which may be in the form of a physical or virtual machine, execute various processes on data. The data is stored on storage nodes. In some examples, data may be stored in object storage. Object storage refers to a data storage architecture that manages data as objects, typically in an unstructured form. This is different than structured data storage systems such as a database. Each object typically includes data, metadata, and a globally unique identifier.

Cloud computing systems often serve various tenants. Those tenants may own and operate a number of client computing devices that utilize the compute and storage nodes of the cloud computing infrastructure. It is desirable to improve the efficiency at which tenants are able utilize the cloud computing infrastructure.

SUMMARY

According to one example, a method includes receiving from a client device, a data object for storage within an object storage system. The method further includes performing a first hash on the data object to determine a placement group for the data object, the placement group being associated with a plurality of object storage devices within the object storage system. The method further includes performing at least one subsequent hash on tenant profile data associated with the data object to determine an object storage device of the plurality of object storage devices to which to store the data object. The method further includes autoscaling the object storage device based on active compute jobs associated with data objects stored on the object storage device.

According to one example, a method includes receiving from a client device, a data object for storage within an object storage system, performing a plurality of hashes on the data object tenant profile data associated with the data object to determine one of a plurality of object storage devices to which to store the data object, and autoscaling the object storage device based on active compute jobs associated with data objects stored on the object storage device.

According to one example, a system includes a processor and a memory comprising machine readable instructions that when executed by the processor, cause the system to receive from a client device, a data object for storage within an object storage system. The system is further to perform a first hash on the data object to determine a placement group for the data object, the placement group being associated with a plurality of object storage devices within the object storage system. The system is further to perform at least one subsequent hash on tenant profile data associated with the data object to determine an object storage device of the plurality of object storage devices to which to store the data object. The system is further to scale the object storage device based on active compute jobs associated with data objects stored on the object storage device.

BRIEF DESCRIPTION OF THE DRAWINGS

FIG. 4 is a flowchart showing an illustrative method for scalable object storage devices, according to one example of principles described herein.

Figure 1:
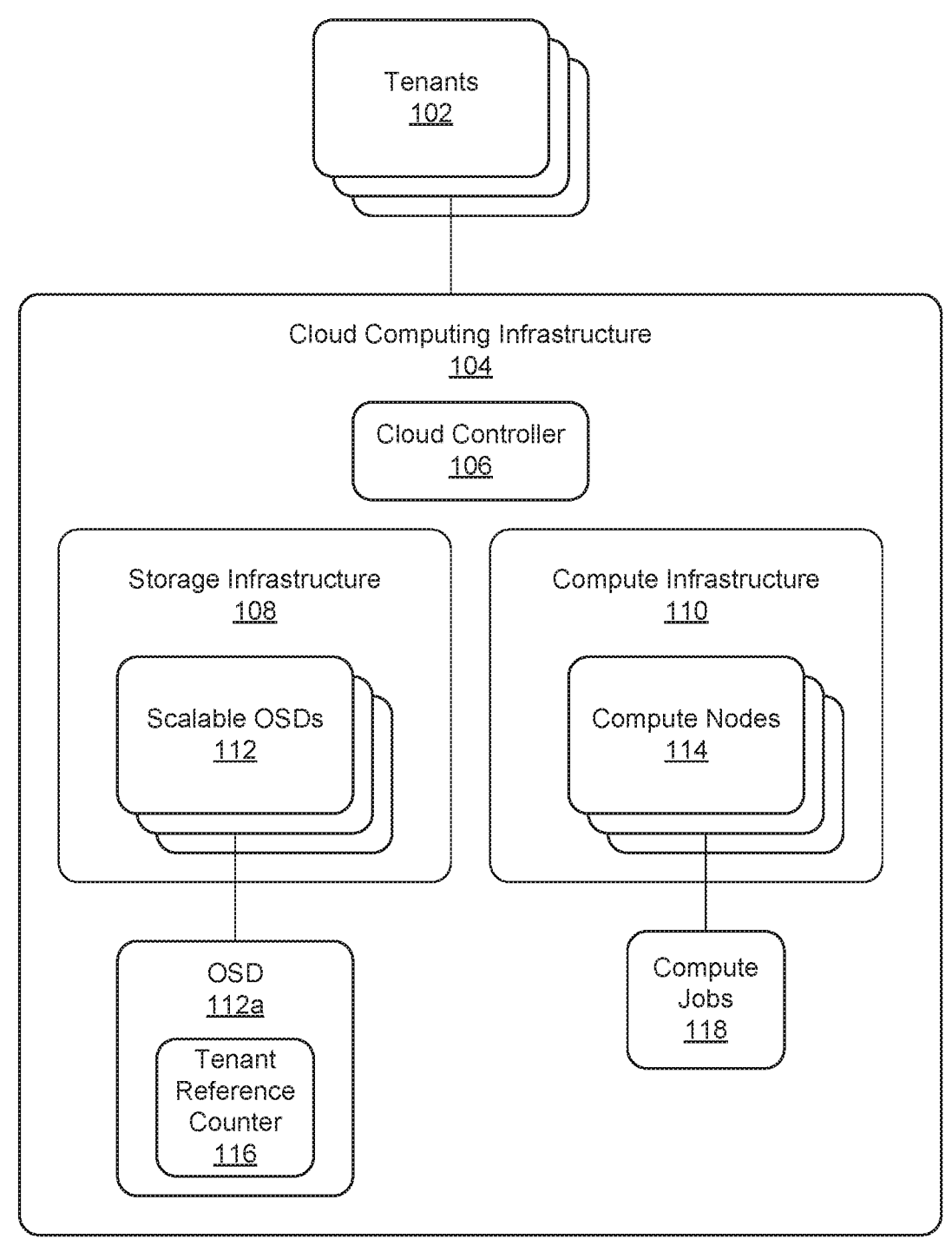
FIG. 1 is a diagram showing an illustrative cloud computing infrastructure that utilizes scalable object storage devices, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to improve the efficiency at which tenants are able utilize the cloud computing infrastructure. Some cloud computing infrastructures separate processing and storage functionality. In such cases, the cloud computing infrastructure includes a number of compute nodes that perform processing tasks. The cloud computing infrastructure also includes an object storage system for storing data objects. One example of an object storage system is Ceph.

When tenants utilize the cloud computing system, data objects created by various processes are stored on the various object storage devices associated with the cloud computing system. Conventionally, a deterministic hash is applied to a data object in order to determine which object storage device of a pool of object storage devices will receive the data object for storage. This is a consistent way to determine where any given data object is to be stored. As more and more tenants use the cloud computing system, data objects are placed randomly across the pool of object storage devices.

Data objects that are stored on the object storage devices are often available for use by active compute jobs running on the compute nodes. However, there are often situations where some tenants are not very active and may not currently be using any of the object storage devices. However, because a particular object storage device will typically have data objects from a wide variety of tenants placed on it, the object storage device is not able to be put on standby or shutdown to conserve resources.

According to principles described herein, more efficient scaling of object storage devices is provided. This is done by storing data such that data objects from the same tenant, or division within a tenant, are stored on a particular object storage device. To do this, the metadata associated with a particular data object includes tenant profile information. The tenant profile information may include an identifier for the tenant, an identifier for a division (e.g., department) within the tenant's organization, and in some cases, an identifier for a subdivision (e.g., development team) within the organization.

The tenant profile information is used to determine placement of a data object. In one example, a multilevel hash may be applied. A first hash of the data object may be used to determine a placement group. The placement group is associated with a set of object storage devices. Additionally, one or more additional hashes may be applied to information within the tenant profile. For example, the tenant identifiers, as well as the identifiers for any division or subdivisions, may be hashed to determine a specific object storage device for placement of the data object.

With data objects stored as described above, the computing resources devoted to a particular object storage device may be scaled based on the number of active compute jobs associated with data objects on that object storage device. If there are no active compute jobs associated with the data objects on the object storage device, then the object storage device may be placed in a standby mode or shut down. This frees up resources for use elsewhere.

By storing data using the hashing scheme above, there is an increased likelihood that there will be at least some periods of time in which there are no active compute jobs for a given object storage device. Thus, computing resources may be conserved because the object storage device may be put in a standby mode, or shutdown, until the data objects are further needed. For example, a particular company may have global operations with several different teams. One team may be on one side of the world while another team may be on the opposite side of the word. By placing the data objects from each team on separate object storage devices using the hashing scheme described above, rather than mixing the object storage devices per team, there will be more periods of time in which there are no active compute jobs for objects on the object storage devices. Thus, resources can be conserved by shutting down or hibernating the object storage devices not currently being associated with active compute jobs.

FIG. 1 is a diagram showing an illustrative cloud computing infrastructure 104 that utilizes scalable object storage devices. According to the present example, the cloud computing infrastructure 104 serves a plurality of tenants 102. The cloud computing infrastructure 104 further includes a cloud controller 106, a storage infrastructure 108, and a compute infrastructure 110.

The plurality of tenants may include various individuals or organizations that are registered to use the services of the cloud computing infrastructure. A particular tenant may have one or more client devices that communicates with the cloud computing infrastructure 104 over a network such as the Internet. The client devices associated with the tenants 102 may send processing requests to the cloud computing infrastructure 104. Those requests may then be processed by the compute infrastructure 110. Data used and/or created by the compute infrastructure may be stored as object in the storage infrastructure 108.

The cloud computing architecture 104 may be managed by a cloud controller 106. The cloud controller 106 may receive processing request from the tenant and decide which of several compute nodes will process the request. The cloud controller 106 may also decide which of several storage nodes may be used to store objects associated with the processing requests.

The storage nodes may be part of the storage infrastructure 108. The storage nodes may be, for example, object storage devices 112. An object storage device is a logical storage that may be embodied as a physical node or a virtual node. For example, a particular server may be designated as an object storage device 112 and have the primary purpose of storing objects thereon. In some examples, the object storage device 112 may be part of a virtual machine running in the cloud environment.

The object storage devices 112 may use object storage in which data is stored as objects rather than in a structured format such as a database. In object storage, data objects include data itself as well as metadata for that data. The data objects also include a globally unique identifier.

Each object storage device 112 may be scalable. Scalability may be achieved in a variety of ways. In one example, an object storage device 112 may be scalable by allocating varying levels of computing resources. For example, in the case where an object storage device 112 is a virtual construct, various amounts of guest memory may be allocated to an object storage device 112. For example, the number of CPU cores, amount of Random Access Memory (RAM), and the amount of disk cache may vary. As will be explained in further detail below, an object storage device 112 may be scaled based on the number of active compute jobs 118 associated with the data objects stored thereon.

Compute jobs 118 are performed by the compute infrastructure 110. The compute infrastructure 110 may include a number of compute nodes 114. Each compute node receives processing requests from one of the tenants 102 and executes the processing requests, which are also referred to as compute jobs. As the compute jobs 118 operate on various pieces of data, that data may be stored by the object storage devices. As will be explained in further detail below, various hashing schemes may be used to determine which of the several object storage devices a particular data object will be sent to for storage.

As data objects are stored to the object storage devices 112, each object storage device maintains and updates a tenant reference counter 116. For example, object storage device 112a may maintain a tenant reference counter that 116 that keeps track of the number of active compute jobs associated with the data objects stored thereon. In some examples, the tenant reference counter keeps track of the number of tenants with active compute jobs 118 associated with data objects stored thereon. The tenant reference counter 116 may be maintained, for example, by a reporting mechanism through the cloud controller 106. In other words, the cloud controller 106 may keep track of the active compute jobs 118 as well as the data objects associated with those active compute jobs. And, the cloud controller 106 may notify the object storage devices 112 accordingly so that the object storage devices 112 can update their respective tenant reference counters 116.

Figure 2:
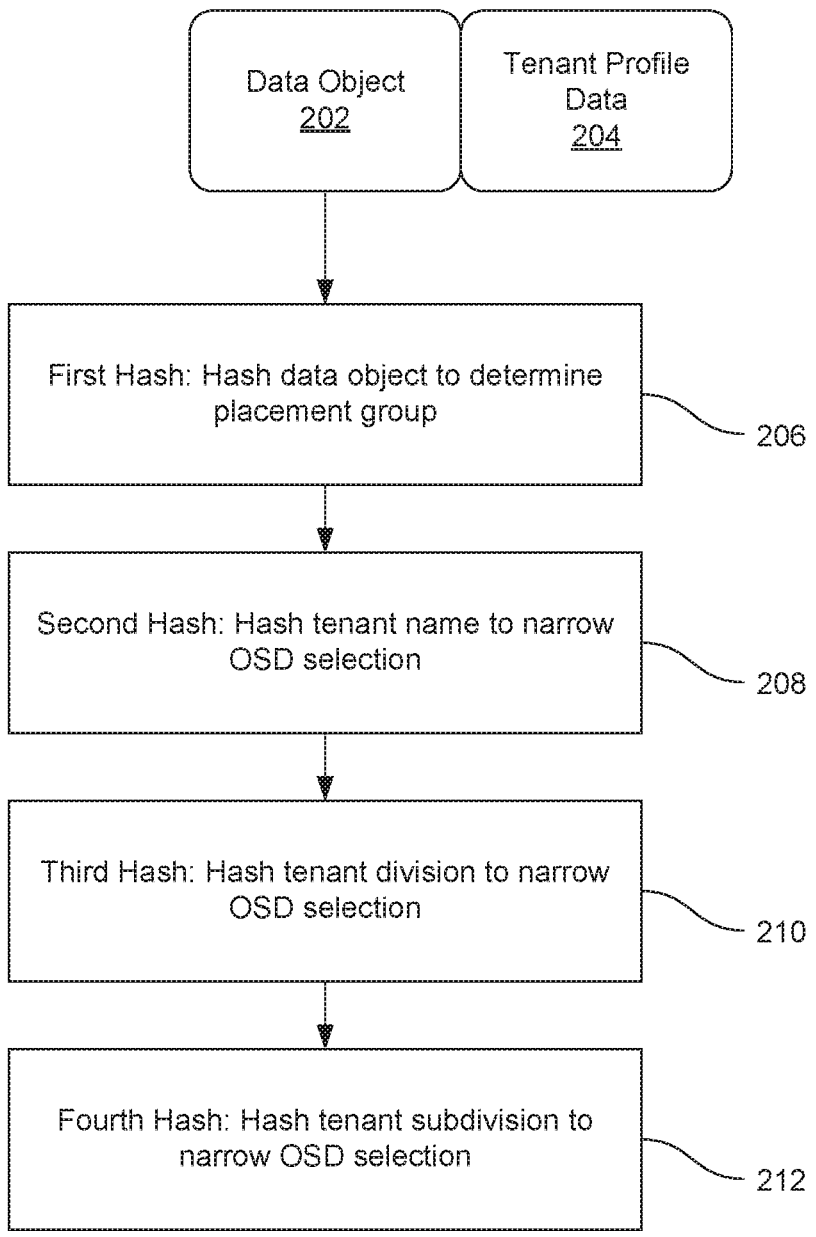
FIG. 2 is a diagram showing an illustrative hashing process for data placement, according to one example of principles described herein.

FIG. 2 is a diagram showing an illustrative hashing process for data placement. According to the present example, the metadata associated with each data object 202 may include tenant profile data 204. The tenant profile data may include information about the tenant, as well as the client device associated with the tenant. For example, the tenant profile data 204 may include a unique identifier for the tenant associated with the data object 202. The tenant profile data 204 may also include information indicating various divisions or subdivisions within the tenant's organization.

For example, a tenant may be a global corporation and may have several departments, divisions, and teams. Various tenants may have different hierarchical structures. The tenant profile data 204 may thus include unique identifiers for divisions or subdivisions within the tenant's organizations. Further hierarchical levels are also contemplated.

According to the present example, at process 206, a first hash is applied to the data within the data object itself. This first hash determines a placement group for the data object. As will be explained in further detail below, a placement group is associated with a plurality of object storage devices, which may be a subset of the total available object storage devices.

At process 208, a second hash is applied to the tenant profile data 204 to further narrow down the set of object storage devices which may be used for the data object 202. The second hash may be applied, for example, to the tenant identifier. At process 210 a third hash is applied to the tenant profile data 204 to further narrow down the set of object storage devices which may be used for the data object 202. The third hash may be applied, for example, to a division identifier. The division identifier may identify a department within the tenant's organization. At process 212 a fourth hash is applied to the tenant profile data 204 to further narrow down the set of object storage devices which may be used for the data object 202. The fourth hash may be applied, for example, to a subdivision identifier. The subdivision identifier may identify a specific team within the tenant's organization.

In the present example, the fourth hash is the final hash that determines the final object storage device for placement of the data object 202. In some examples additional hashes may be applied based on the tenant's organizational structure. In some examples, only the second hash may be applied to determine the final object storage device placement for the data object 202.

By applying hashes in this manner, data objects stored on a particular object storage device are more likely to have data objects from the same team within a tenant's organization. Thus, it is more likely that all the data objects will be both active and inactive around the same time. Thus, when all data objects are inactive (i.e., have no active compute jobs associated therewith), the object storage device may be temporarily shut down. Even if some data objects are still active, the object storage device can be scaled back to consume fewer resources. For example, fewer CPU cores may be dedicated to the object storage device. Additionally, less RAM and disk cache may be allocated to the object storage device.

Figure 3:
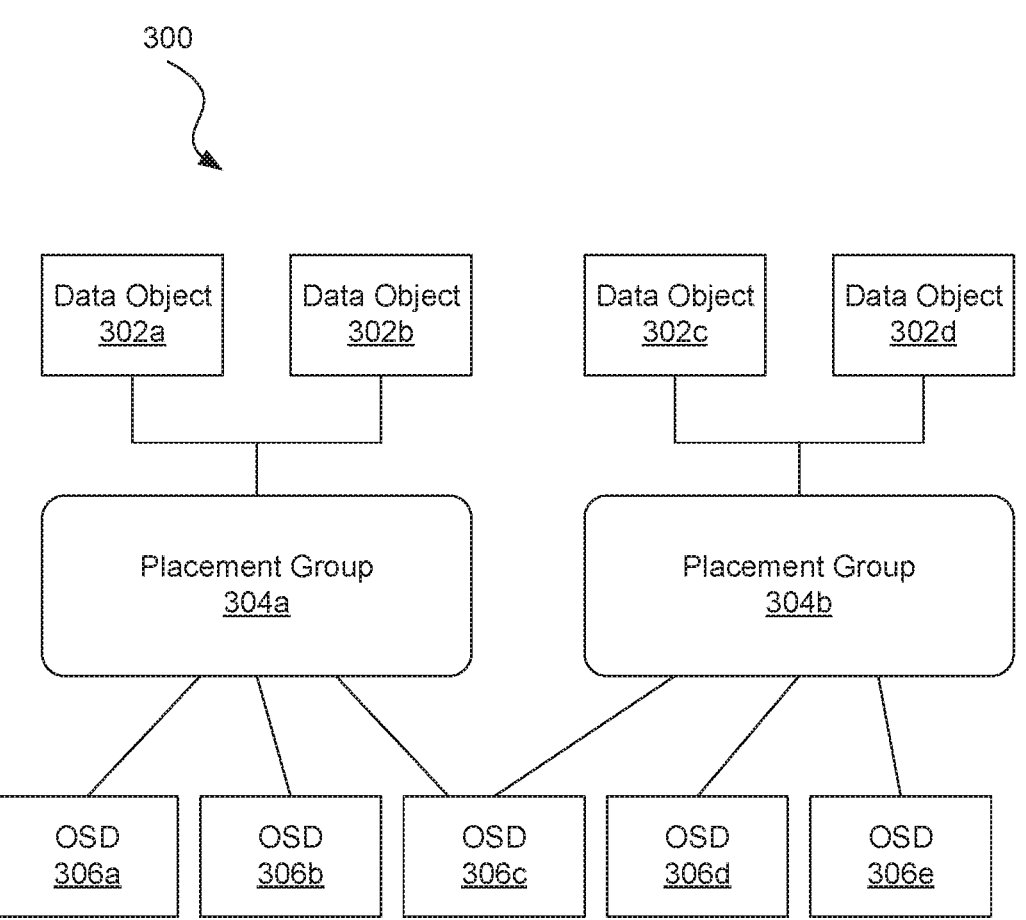
FIG. 3 is a diagram showing illustrative placement of data objects, according to one example of principles described herein.

FIG. 3 is a diagram showing illustrative placement of data objects 302a, 302b, 302c, 302d. In the present example, the data objects are put into placement groups 304a, 304b. Placement group assignment may be determined via a hash (e.g. the first hash 206). Specifically, data objects 302a and 302b may be placed in placement group 304a after the data within those data objects are hashed. Similarly, the data objects 302c and 302d are put into placement group 304b after hashing the data within those data objects. The data objects 302a 302b that are in placement group 304a may then be placed in one of a plurality of object storage devices 306a, 306b, 306c. This may be done based on one or more additional hashes of the information within the metadata that indicates hierarchical positions within an organization as described above. Similarly, the data objects 302c and 302d within placement group 304b may be assigned to one of a plurality of object storage devices 306c, 306d, 306e.

In the present example, the placement groups 304a, 304b have overlapping object storages devices associated therewith. Specifically, both placement groups 304a, 304b use object storage device 306c. However, in some examples, the groups of object storage devices associated with a particular placement group may be non-overlapping. For example, object storage device 306c may be associated with only placement group 304a, and not placement group 304b.

FIG. 4 is a flowchart showing an illustrative method for scalable object storage devices. According to the present example, the method 400 includes a process 402 for receiving from a client device, a data object (e.g., 202, FIG. 2) for storage within an object storage system. The client device may be a computing system owned and operated by an organization that uses the services of the object storage system. In other words, the organization is a tenant of a cloud computing infrastructure (e.g., 104) associated with the object storage system (e.g., 108, FIG. 1). The data object may include both data and metadata. The metadata may include tenant profile data (e.g., 204, FIG. 2).

The method 400 further includes a process 404 for performing a first hash (e.g., 206, FIG. 2) on the data object to determine a placement group (e.g., 304a, 304b) for the data object, the placement group being associated with a plurality of object storage devices (e.g., 112, FIG. 1) within the object storage system. The first hash may be applied to the data within the data object itself. In other words, the first hash may be applied to the data and not the metadata of the data object.

The method 400 further includes a process 40 for performing at least one subsequent hash on tenant profile data associated with the data object to determine an object storage device of the plurality of object storage devices to which to store the data object. For example, the second hash may be applied, for example, to a tenant identifier. In some examples, a third hash is applied to the tenant profile data to further narrow down the set of object storage devices which may be used for the data object. The third hash may be applied, for example, to a division identifier. The division identifier may identify a department within the tenant's organization. Further hashes may be applied based on the tenant's hierarchical structure.

The method 400 further includes a process 408 for autoscaling the object storage device based on active compute jobs (e.g., 118) associated with data objects stored on the object storage device. In one example, each object storage device maintains and updates a tenant reference counter. For example, object storage device may maintain a tenant reference counter that keeps track of the number of active compute jobs associated with the data objects stored thereon. In some examples, the tenant reference counter keeps track of the number of tenants with active compute jobs associated with data objects stored thereon. The tenant reference counter may be maintained, for example, by a reporting mechanism through the cloud controller 106. In other words, the cloud controller may keep track of the active compute jobs as well as the data objects associated with those active compute jobs. And, the cloud controller may notify the object storage devices accordingly so that the object storage devices can update their respective tenant reference counters.

By applying hashes in this manner, data objects stored on a particular object storage device are more likely to have data objects from the same team within a tenant's organization. Thus, it is more likely that all the data objects will be both active and inactive around the same time. Thus, when all data objects are inactive (i.e., have no active compute jobs associated therewith), the object storage device may be temporarily shut down. Even if some data objects are still active, the object storage device can be scaled back to consume fewer resources. For example, fewer CPU cores may be dedicated to the object storage device. Additionally, less RAM and disk cache may be allocated to the object storage device.

Figure 5:
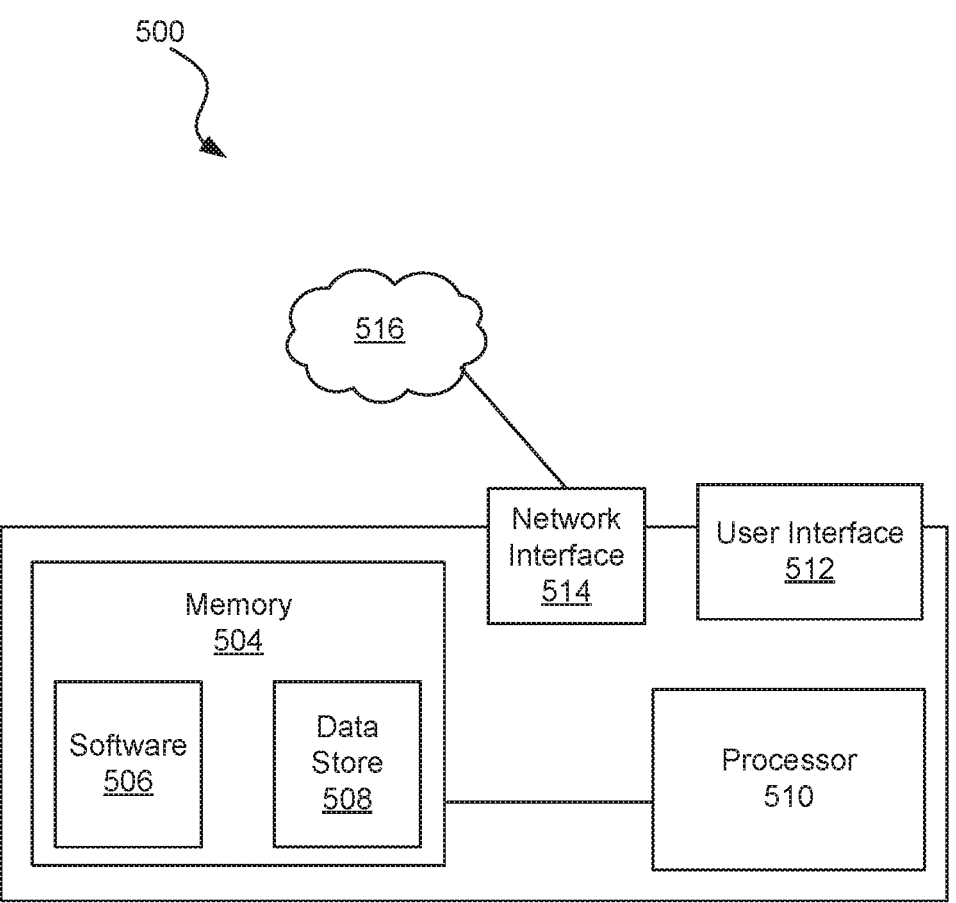
FIG. 5 is a diagram showing an illustrative computing system that may be used to perform the principles described herein.

FIG. 5 is a diagram showing an illustrative computing system that may be used to perform the principles described herein. For example, the computing system 500 may be used to perform the functions performed in methods 300 and 400. Other functions described herein may also be performed by computing systems such as computing system 500. According to certain illustrative examples, the computing system 500 includes a memory 504 which may include software 506 and a data store 508. The processing system 500 also includes a processor 510, a network interface 514, and a user interface 512.

The memory 504 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The computing system 500 also includes a processor 510 for executing the software 506 and using or updating the data 508 stored in memory 504. The software 506 may include an operating system and any other software applications a user may wish to install. In some examples, the computing system 500 may be associated with a user. The software 506 may include machine readable instructions of a computer program product that when executed, perform the functions described above.

The user interface 512 may include a number of input devices such as a mouse, touchpad, or touchscreen that allow the user to interact with the computing system 500. The user interface 512 may also include a number of different types of output devices such as a monitor or a touchscreen. The user interface allows the user to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 514 may also be designed to communicate with the network 516 using wireless technologies.

Some examples of processing systems described herein may include non-transitory, tangible, machine readable media that include executable code that when run by one or more processors may cause the one or more processors to perform the processes of methods as described above. Some common forms of machine-readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
receiving from a client device, a data object for storage within an object storage system, the data object comprising data and metadata associated with the data;
performing a first hash on the data of the data object;
determining, based on the first hash, a placement group for the data object, the placement group being associated with a plurality of object storage devices comprising a subset of total available object storage devices within the object storage system;
performing at least one subsequent hash on tenant profile data of the metadata associated with the data;
selecting, based on the at least one subsequent hash, between two or more object storage devices of the plurality of object storage devices to determine a first object storage device to store the data object, the first object storage device being one of the plurality of object storage devices in the placement group;
storing the data object on the first object storage device;
in response to storing the data object on the first object storage device, updating a tenant reference counter indicative of a number of active compute jobs operating on a plurality of data objects stored on the first object storage device, the plurality of data objects comprising the data object; and
autoscaling an amount of a computing resource allocated to the first object storage device based on the number of active compute jobs associated with the plurality of data objects stored on the first object storage device.

2. The method of claim 1, wherein the tenant reference counter further indicates how many tenants currently have active compute jobs associated with the plurality of data objects stored on the first object storage device.

3. The method of claim 2, wherein autoscaling the amount of the computing resource allocated to the first object storage device based on the number of active compute jobs further comprises designating additional computing resources to the first object storage device as the tenant reference counter increases.

4. The method of claim 2, wherein autoscaling the amount of the computing resource allocated to the first object storage device based on the number of active compute jobs further comprises releasing resources for the first object storage device in response to the tenant reference counter decreasing.

5. The method of claim 1, further comprising shutting down the first object storage device if there are no tenants with active compute jobs associated with the plurality of data objects stored on the first object storage device.

6. The method of claim 1, wherein the at least one subsequent hash is performed on information of the tenant profile data that indicates a division within a tenant organization.

7. The method of claim 6, further comprising performing another hash on the tenant profile data on information of the tenant profile data that indicates a subdivision within the tenant organization.

8. The method of claim 1, wherein the first object storage device comprises a virtual machine.

9. A method comprising:

receiving from a client device a data object for storage within an object storage system, the data object comprising data and metadata associated with the data;

determining a placement group comprising a plurality of object storage devices to store the data object by a first hash on the data of the data object, the plurality of object storage devices comprising a subset of total available object storage devices within the object storage system;

performing a plurality of subsequent hashes on tenant profile data of the metadata associated with the data;

determining, based on the plurality of subsequent hashes, a first object storage device of the plurality of object storage devices in the placement group to store the data object;

storing the data object on the first object storage device;

in response to storing the data object on the first object storage device, updating the tenant profile data to indicate a number of active compute jobs operating on the first object storage device; and autoscaling an amount of a computing resource allocated to the first object storage device based on the number of active compute jobs operating on a plurality of data objects stored on the first object storage device.

10. The method of claim 9, wherein performing the plurality of subsequent hashes comprises performing a second hash on information in the tenant profile data that identifies a tenant.

11. The method of claim 10, wherein performing the plurality of subsequent hashes further comprises performing a third hash on information in the tenant profile data that identifies a division of an organization associated with the tenant.

12. The method of claim 11, wherein performing the plurality of subsequent hashes further comprises performing a fourth hash on information in the tenant profile data that identifies a subdivision of the organization associated with the tenant.

13. The method of claim 9, further comprising maintaining a number of tenants that have active compute jobs operating on the plurality of data objects stored in the first object storage device.

14. The method of claim 13, wherein autoscaling the amount of the computing resource allocated to the first object storage device based on the number of active compute jobs comprises, in response to determining that the number of tenants has increased, assigning more computing resources to the first object storage device.

15. The method of claim 13, wherein autoscaling the amount of the computing resource allocated to the first object storage device based on the number of active compute jobs comprises, in response to determining that the number of tenants has decreased, decreasing computing resources assigned to the first object storage device.

16. A system comprising:

a processor; and a memory comprising machine readable instructions that, when executed by the processor, cause the system to:

receive from a client device, a data object for storage within an object storage system, wherein the data object comprises data and metadata associated with the data;

perform a first hash on data of the data object;

determine, based on the first hash, a placement group for the data object, the placement group being associated with a plurality of object storage devices comprising a subset of total available object storage devices within the object storage system;

perform at least one subsequent hash on tenant profile data of the metadata associated with the data;

select, based on the at least one subsequent hash, between two or more object storage devices of the plurality of object storage devices to determine a first object storage device to store the data object, the first object storage device being one of the plurality of object storage devices in the placement group;

store the data object on the first object storage device;

in response to storing the data object on the first object storage device, updating the tenant profile data to indicate a number of active compute jobs operating on the first object storage device; and autoscaling an amount of a computing resource allocated to the first object storage device based on the number of active compute jobs operating on a plurality of data objects stored on the first object storage device.

17. The system of claim 16, wherein to autoscale the amount of the computing resource allocated to the first object storage device based on active compute jobs, the instructions further cause the system to maintain a tenant reference count, the tenant reference count indicating how many tenants currently have active compute jobs associated with the data objects stored on the first object storage device.

18. The system of claim 16, wherein the instructions further cause the system to shut down the first object storage device if there are no tenants with active compute jobs associated with the data objects stored on the first object storage device.

* * * * *